US008191861B2

United States Patent
Elsässer et al.

(10) Patent No.: US 8,191,861 B2
(45) Date of Patent: Jun. 5, 2012

(54) CONTROL VALVE FOR CONTROLLING A GAS FLOW

(75) Inventors: Alfred Elsässer, Keltern (DE); Achim Gommel, Simmozheim (DE); Karl-Heinz Hanslik, Stuttgart (DE)

(73) Assignee: Mahle International GmbH (DE)

( * ) Notice: Subject to any disclaimer, the term of this patent is extended or adjusted under 35 U.S.C. 154(b) by 552 days.

(21) Appl. No.: 12/438,829

(22) PCT Filed: Jul. 30, 2007

(86) PCT No.: PCT/EP2007/057828
§ 371 (c)(1),
(2), (4) Date: Feb. 25, 2009

(87) PCT Pub. No.: WO2008/022876
PCT Pub. Date: Feb. 28, 2008

(65) Prior Publication Data
US 2009/0200505 A1    Aug. 13, 2009

(30) Foreign Application Priority Data

Aug. 25, 2006  (DE) .................. 10 2006 039 827

(51) Int. Cl.
*F16K 1/22* (2006.01)
(52) U.S. Cl. ........................................ 251/306; 123/337
(58) Field of Classification Search .......... 251/304–306; 123/337
See application file for complete search history.

(56) References Cited

U.S. PATENT DOCUMENTS

| 2,110,211 A | | 5/1932 | Farrell | |
|---|---|---|---|---|
| 2,712,387 A | * | 7/1955 | Young | 210/392 |
| 2,946,554 A | * | 7/1960 | Asker et al. | 251/306 |

(Continued)

FOREIGN PATENT DOCUMENTS

DE    1080813    4/1960

(Continued)

OTHER PUBLICATIONS

English abstract for FR-2515303, Apr. 29, 1983.

(Continued)

*Primary Examiner* — John Fristoe, Jr.
*Assistant Examiner* — Marina Tietjen
(74) *Attorney, Agent, or Firm* — Rader, Fishman & Grauer PLLC

(57) ABSTRACT

The present invention relates to a control valve (1) for controlling a gas flow in a gas line (3) of an internal combustion engine, in particular in a motor vehicle, comprising a rotationally adjustable flap (4) for controlling a flow cross section (13), a throttling sealing gap (14) which, in a closed position of the flap (4), is formed radially between a sealing contour (15) of the flap (4) and a sealing face (16) which faces the flap (4), and a drive shaft (5), on which the flap (4) is arranged fixedly in terms of rotation. In order to simplify the adjustment of the throttling sealing gap (14), a line piece (2) is provided for installation in the gas line (3) axially between line ends (9), wherein the flap (4) controls the flow cross section (13) of the line piece (2), wherein the sealing face (16) is formed on the line piece (2), wherein the drive shaft (5) penetrates the line piece (2) and is mounted in two bearings (18), wherein two bearing shells (19) are provided which are arranged on the outside of the line piece (2) and in each case have one of the bearings (18).

20 Claims, 3 Drawing Sheets

U.S. PATENT DOCUMENTS

Figure 1:
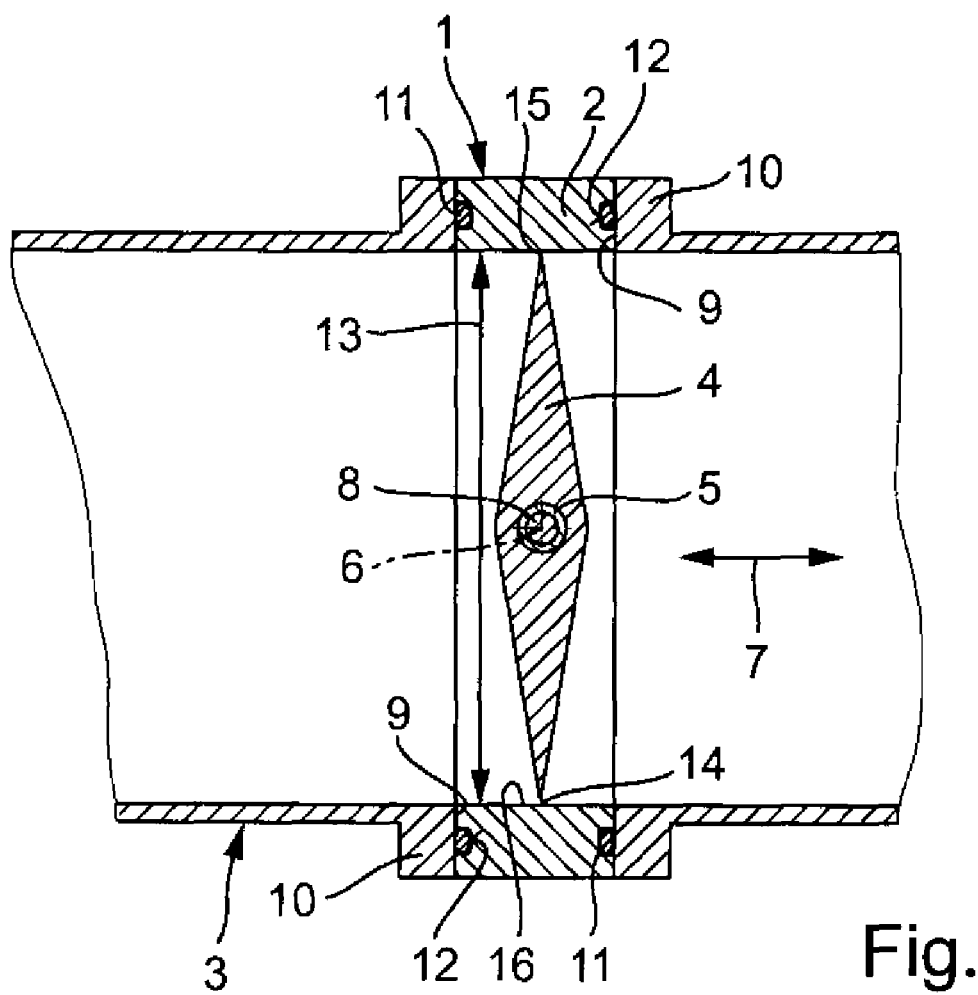

| | | | |
|---|---|---|---|
| 3,485,476 A | | 12/1969 | Hemphill |
| 4,981,284 A | * | 1/1991 | Imamura et al. ............. 251/305 |
| 5,188,078 A | | 2/1993 | Tamaki |
| 5,370,148 A | * | 12/1994 | Shafer ..................... 137/15.25 |
| 5,370,361 A | * | 12/1994 | Mendell et al. ............... 251/307 |
| 5,678,594 A | * | 10/1997 | Hill ............................... 137/338 |
| 5,797,589 A | | 8/1998 | Kalebjian |
| 5,902,426 A | | 5/1999 | Daly |
| 6,065,483 A | | 5/2000 | Tanaka et al. |
| 6,857,810 B2 | * | 2/2005 | Ersoy et al. .................. 403/131 |
| 6,895,926 B1 | * | 5/2005 | Moreau et al. ................ 123/336 |
| 2003/0111628 A1 | * | 6/2003 | Nanba et al. .................. 251/214 |
| 2004/0104373 A1 | * | 6/2004 | Dutmer et al. ................ 251/305 |
| 2005/0017211 A1 | | 1/2005 | Hannewald |
| 2006/0048748 A1 | | 3/2006 | Utz et al. |

FOREIGN PATENT DOCUMENTS

| | | |
|---|---|---|
| DE | 1600764 | 4/1972 |
| DE | 2829398 | 1/1980 |
| DE | 4202437 | 7/1992 |
| DE | 4323087 | 1/1995 |
| DE | 19781531 | 12/1998 |
| DE | 69822944 | 4/2005 |
| DE | 102004043125 | 3/2006 |
| EP | 0841477 | 5/1998 |
| EP | 0886089 | 12/1998 |
| EP | 1284347 | 2/2003 |
| EP | 1612387 | 1/2006 |
| FR | 2515303 | 4/1983 |
| JP | 080303260 | 11/1996 |
| WO | WO-2005/002823 | 1/2005 |

OTHER PUBLICATIONS

English abstract for EP-0886089, Dec. 23, 1998.
English abstract for EP-0841477, May 13, 1998.
English abstract for DE-4323078, Jan. 12, 1995.
English abstract for JP-080303260, Nov. 19, 1996.

* cited by examiner

CONTROL VALVE FOR CONTROLLING A GAS FLOW

CROSS-REFERENCES TO RELATED APPLICATION

This application is a National Stage application which claims the benefit of International Application No. PCT/EP2007/057828 filed Jul. 30, 2007, which claims priority based on German Patent Application No. DE 102006039827.0, filed Aug. 25, 2006, both of which are hereby incorporated by reference in their entirety.

The present invention relates to a control valve for controlling a gas flow in a gas line of an internal combustion engine, in particular in a motor vehicle, comprising the features of the preamble of claim 1.

From EP 1 498 596 A2, such a control valve is known which has a flap, which is rotationally adjustable about a rotational axis which runs transverse to the flow direction, for controlling of a flow cross section. The flap is arranged rotationally fixed on a drive shaft which runs coaxial to the rotational axis. In the closed position of the flap, a throttling sealing gap is radially formed between a sealing contour of the flap and a sealing face which faces the flap.

In the known control valve, in addition, a separate insert part is provided which is arranged inside the gas line, through which the drive shaft extends, at which the sealing face is formed, and the flow cross section of which is controlled by the flap. Furthermore, the insert part is at least one-time adjustable relative to the flap to thereby be able to adjust the throttling sealing gap. The adjustment of the throttling sealing gap for insert parts inserted within the gas line can be comparatively complex, which can be a disadvantage for a high volume production of such control valves.

The present invention is concerned with the problem to propose, for a control valve of the type mentioned above, an improved embodiment which is characterized in particular by a reduced manufacturing expenditure.

This problem is solved according to the invention by means of the subject matter of the independent claim.

Advantageous embodiments are subject matter of the dependent claims.

The invention is based on the general idea to use, instead of an insert part to be arranged inside the gas line, a line piece which is to be arranged axially between line ends opposing one another. This line piece is then penetrated by the drive shaft of the flap, has the flow cross section controlled by the flap, and has the sealing face which interacts for forming the throttling sealing gap with the sealing contour of the flap. Furthermore, on the outside on the line piece, on diametrically opposing sides, two bearing shells are arranged, each of which has a bearing, wherein within these bearings, the drive shaft is supported. The invention hence proposes a unit which can be completely pre-assembled within the scope of a pre-assembly and which, within the scope of a final assembly, can be installed in comparatively simple manner into the respective gas line. Within the scope of the pre-assembly, it is in particular possible here to adjust the desired throttling gap, which can be realized in a simplified manner due to the independency of the line piece from the rest of the gas line. Since the bearing shells are arranged with the bearings at the outside of the line piece, while at the same time the sealing face and the flap are arranged on the inside of the line piece, a structural separation between the components for forming the throttling sealing gap and the components for positioning and supporting the drive shaft can be realized. Hereby, it is in particular possible to use materials and substances which are adapted to the different functions.

Further important features and advantages are apparent from the sub-claims, the drawings and from the associated description of the figures by means of the drawings.

It is to be understood that the above mentioned features and the features yet to be described hereinafter are not only usable in the respective stated combination, but also in other combinations, or on its own, without departing from the scope of the present invention.

Preferred exemplary embodiments of the invention are illustrated in the drawings and are explained in the following description in more detail, wherein the same reference numbers refer to the same, or similar, or functionally identical components.

Figure 2:
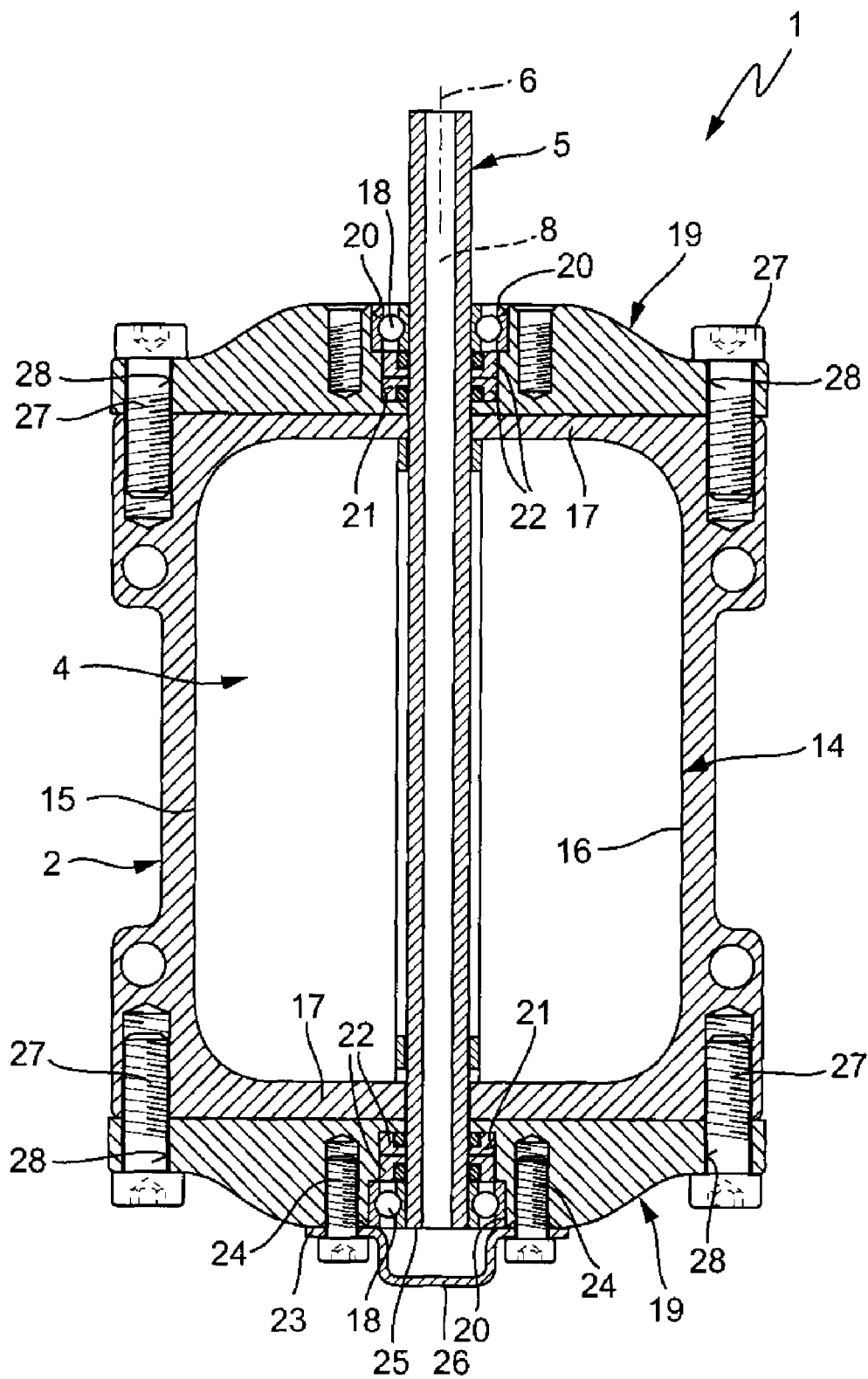
Figure 3:
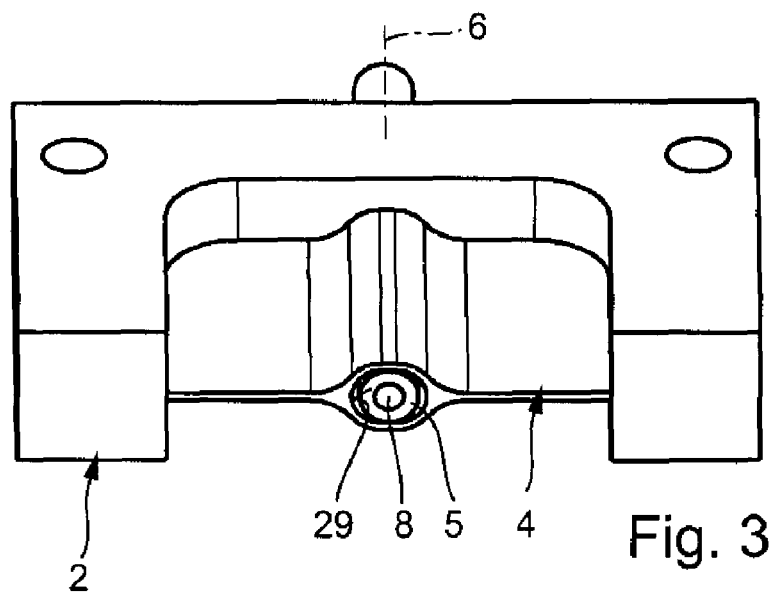
Figure 4:
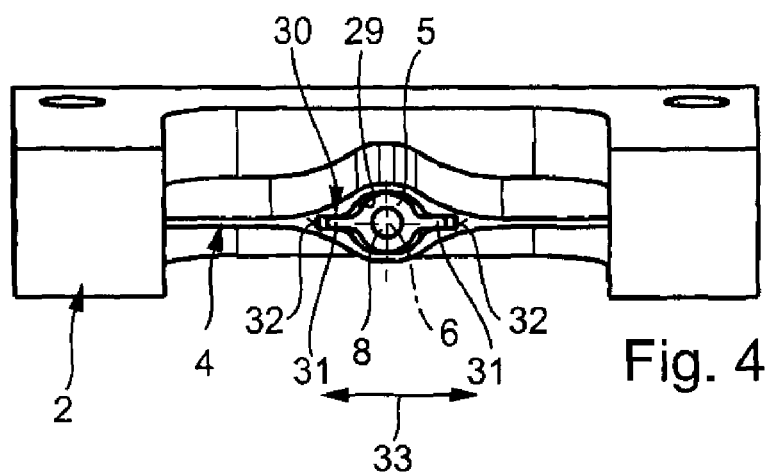
Figure 5:
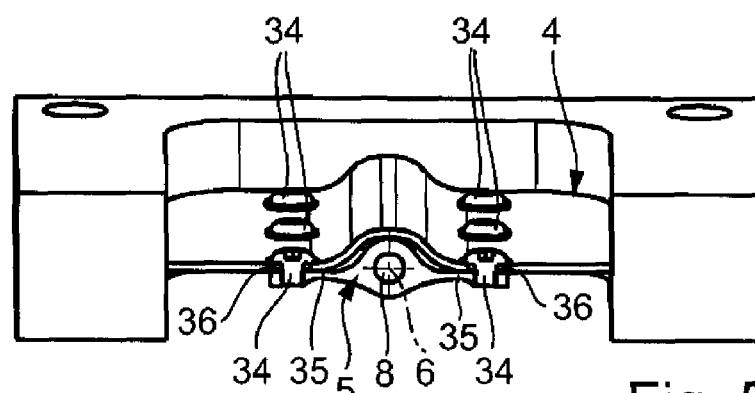

In the figures:

FIG. 1 shows schematically a greatly simplified longitudinal section through a gas line with a control valve inserted therein, FIG. 2 shows schematically a perspective view on a cross section of the control valve, FIGS. 3 to 5 each show schematically a longitudinal section through the control valve in the region of a flap for different embodiments.

According to FIG. 1, a control valve 1 comprises a line piece 2 which is installed in a pre-assembled state into a gas line 3. The control valve 1 can basically be a throttle flap of an internal combustion engine, wherein then the gas line 3 is a fresh gas line of an internal combustion engine. Also, the control valve 1 can be a cycle valve, which substantially is switched over between two end positions (open position and closed position) only. Such a cycle valve can be arranged, for example, within a fresh gas line of an internal combustion engine, in particular for pulse supercharging or, e.g., for de-throttling of Otto engines. For this, the respective internal combustion engine is preferably arranged within a motor vehicle. Of particular importance for such control valves 1 is the achievement of a sufficient sealing of the respective gas line 3 when the respective valve element 4, here a flap, is in its closed position shown here. In addition, such a control valve 1 has to operate as low-wear as possible, wherein the achievability of switching times as short as possible is desirable.

As a control element, the control valve 1 has, according to FIG. 1, a flap 4 which is rotationally fixed connected with a drive shaft 5. The drive shaft 5 extends coaxial to a rotational axis 6 and thereby allows rotational shifts of the flap 4 about the rotational axis 6. The drive shaft 5 is connected in a conventional manner with a not-shown actuator.

In case of a flap 4, which operates in particular discontinuously, which is formed as a control flap, and which is shiftable back and forth between two end positions, the actuator can allow, for example, rotational shifts of the flap 4 by 90° between the shown closed position (first end position) and an open position (second end position) in which the flap 4 extends parallel to a longitudinal direction of the gas line 3 or to a flow direction of the gas flow transported within the gas line 3, respectively. The longitudinal direction of the gas line 3 or the flow direction of the gas flow, respectively, is symbolized in FIG. 1 by a double arrow indicated with 7.

The shaft 5 is exemplary formed here as a hollow shaft and comprises in its interior a rod-shaped torsion spring 8, which has its neutral position, for example, in the middle between the two end positions, thus at a flap angle of approximately 45°. The actuator interacts via the drive shaft 5 with the torsion spring 8 to generate a spring-mass oscillating system which, depending on the application purpose of the control valve 1, allows the realization of extremely short switching times, e.g. less than 5 ms.

In case of a flap 4, which operates in particular continuously, which is formed as a rotating flap and which virtually rotates without end position in the same rotational direction, thereby passing through phases with increasing and decreasing opening degree, the actuator can cause, for example, rotations of the flap 4, in particular with adjustable speed, in order to adjust, depending on the thereby occurring opening phases and closing phases, the volume flow by means of the control valve 1. For example, to increase the closing phase of such a rotating flap, as structural measures, e.g., lateral indentations with a circular segment-like profile, in which the correspondingly radially increased rotating flap plunges during rotating for a pre-determined rotation angle range, thereby closing the flow cross section, can be provided in the line piece. Within this closing phase, the rotating flap has a virtually unlimited number of closed positions.

In the shown installation state, the line piece 2 is arranged axially between two line ends 9 of the gas line 3 which are aligned opposing one another with respect to the longitudinal direction 7. The line ends 9 are not in direct contact with one another, but abut solely indirectly against one another via the line piece 2. For installation of the line piece 2, at the line ends 9, flange sections 10 can be formed, which are formed complementary to the outer contour of the line piece 2. Advantageously, the line ends 9 are axially clamped via the flange sections 10 by means of appropriate fasteners, e.g. screws, against the line piece 2. To achieve a desired sealing, axially acting seals 11 can be provided which are arranged between the line piece 2 and the respective line end 9. The seals 11 are preferably ring seals, in particular O-rings. Each seal 11 is inserted here into a ring groove 12, which is formed here always at the line piece 2. Also, at least one of the ring grooves 12 can be incorporated in one of the flange sections 10 of the respective line end 9.

Inside, thus at a side exposed to the gas flow, the line piece 2 has a flow cross section 13. Preferably, the flow cross section 13 of the line piece 2 has the same size as the flow cross section of the gas line 3. However, principally, the line piece 2 can have a flow cross section 13 which differs from the flow cross section of the gas line 3.

The rotational axis 6 of the flap 4 extends perpendicular to the flow direction 7. Accordingly, with the aid of the flap 4, the flow cross section 13 of the line piece 2 can be controlled. In the closed position of the flap 4, the flow cross section 13 is more or less blocked, while it is more or less free in the opened position of the flap 4.

For realization of the desired blocking effect in the closed position of the flap 4, the control valve 1 operates with a throttling sealing gap 14 which, in the shown closed position of the flap 4, is radially formed between a sealing contour 15 formed at the flap 4 and a sealing face 16 formed at the line piece 2. For this, the sealing contour 15 is formed by an edge of the flap 4, wherein the edge is located radially outside with respect to the rotational axis 6, and by front sides of the flap 4, wherein the front sides are arranged axial with respect to the rotational axis 6. Here, it is principally possible to run the sealing contour 15 in the area of the axial front sides of the flap 4 in a circular arc-shaped manner around the drive shaft 5 to also form the desired throttling sealing gap 14 in the area of the drive shaft 5.

In circumferential direction, the line piece 2 completely encloses the flow cross section 13, which is controllable by means of the flap 4. Thus, according to FIG. 2, the drive shaft 5 is arranged in such a manner that it penetrates the line piece 2. In the control valve 1 according to the invention, the drive shaft 5 runs through two diametrically opposed wall sections 17 of the line piece 2 and is rotationally adjustable supported on both sides in the area of these wall sections 17 in the bearings 18. The bearings 18 are preferably roller bearings, in particular ball bearings. Moreover, the control valve 1 is equipped with bearing shells 19 which are arranged on diametrically opposing sides outside at the line piece 2, thus on a line piece 2 side facing away from the gas flow. Each bearing shell 19 includes one of the bearings 18 and comprises a corresponding bearing support 20 for this purpose. Furthermore, each bearing shell 19 comprises, here directly adjacent to the bearing support 20 in axial direction, a seal seating 21, in which a radial seal 22 is inserted. The respective radial seal 22 allows a sufficient sealing of inside, which is exposed to the gas flow, against the outside of the line piece 2, even when the drive shaft 5 is rotating. The respective radial seal 22 is fixed in the seal seating 21 by the respective bearing 18, while the respective bearing 18 is fixed in the associated bearing support 20 by a bearing cover 23. In FIG. 2, only one of these bearing covers 23 is shown which is mounted by means of screws 24 to the associated bearing shell 19. In the area of the drive shaft's 5 free end 25 remote from the actuator, in addition, a cup-shaped cover 26 is provided, which is fixed to the associated bearing shell 19 with the aid of the bearing cover 23. Within this cover 26, the drive shaft 5 is rotationally fixed connected with the torsion spring 8 which is not shown in FIG. 2.

Preferably, the bearing shells 19, with respect to the line piece 2, are each formed now as separately fabricated components which are mounted correspondingly in a suitable manner to the line piece 2. In the example, the mounting of the bearing shells 19 to the line piece 2 is carried out by means of the screws 27. As can be seen, the used screws 27 are arranged in a flap plane which is defined by the closed position of the flap 4 and in which the rotational axis 6 is arranged as well.

Advantageously, the bearing shells 19 and the bearings 18 can be adapted to one another with respect to their material selection in such a manner that they have similar coefficients of thermal expansion. In the present context, coefficients of thermal expansion are "similar" when they differ less than 20% from one another or if they are equal. For example, the bearings 18 are made from a steel alloy, while the bearing shells 19 are made from a light metal alloy or from a steel alloy as well. By means of this construction is achieved that the bearings 18, during operation of the control valve 1, which can result in heating of the control valve 1, are not highly stressed in an unacceptable manner due to heat-related thermal expansion within their bearing support 20, and/or are not subject of an unacceptably wide clearance.

Furthermore, it can be provided in one preferred embodiment to adapt the flap 4 and the line piece 2 to one another with respect to the material selection in such a manner that thermal expansion effects, which appear due to the occurring temperatures during proper operation of the control valve 1, do not result in a contact between the flap 4 and the line piece 2 or do not result in an undesired high increase of the throttling sealing gap 14, respectively. This, for example, can be achieved in that the materials used for the flap 4 and the line piece 2 have similar coefficients of thermal expansion. Concerning the term "similar", reference is made to what is mentioned above. Hereby, undesired leakages or sliding contacts, respectively, between the sealing contour 15 and the sealing face 16 can be avoided. Here, the flap 4 and the line piece 2 can be made indeed from different materials. For example, the flap 4 is preferably a plastic part, for example a laminated glass fiber and/or carbon fiber compound part. In contrast to that, the line piece 2 can be a casting from a metal alloy.

Alternatively or in addition to the material selection with similar coefficients of thermal expansion, it can be provided for prevention of a contact between flap 4 and line pipe 2, or for prevention of a throttling sealing gap 14 which is too large, respectively, to select materials for the flap 4 and the line piece 2 which result in a coefficient of thermal expansion as low as possible. In the present context, a "low" coefficient of thermal expansion is to be understood as a coefficient of thermal expansion of maximal $5 \times 10^{-6}$/K at 20° C. In the ideal case, the flap 4 and/or the line piece 2 are to be virtually invariant with respect to heat-related expansions. It is obvious here that a thermal expansion coefficient with the value zero is virtually not possible so that materials, which are virtually invariant with respect to heat-related expansions, have a coefficient of thermal expansion of maximal about $2 \times 10^{-6}$/K at 20° C. in the present context. For example, the line piece 2 can be made from Invar, the coefficient of thermal expansion of which is about 1.7 to $2.0 \times 10^{-6}$/K at 20° C. The flap 4 can have a similarly low coefficient of thermal expansion, for example, when it is manufactured as a glass fiber compound part. By means of the low or minimal coefficients of thermal expansion for the flap 4 and the line piece 2 is also achieved that the throttling sealing gap 14 virtually does not change, or only insignificantly due to the changing temperatures.

Since the bearing shell 19 and the line piece 2 are components which are manufactured separately, the materials used for them can be optimized with respect to the respective function of the respective component. The line piece 2 together with the flap 4 serve for forming the throttling sealing gap 14 which is to be preferably invariant over a temperature range as wide as possible. In contrast to that, the bearing shells 19, together with the bearings 18, arranged therein serve for positioning or for supporting, respectively, of the drive shaft 5. Accordingly, for the control valve 1, it is readily possible to manufacture the flap 4 and the line piece 2 from materials which have a significantly different, in fact lower, coefficient of thermal expansion than the ones used for manufacturing the bearings 18 or for manufacturing the bearing shells 19, respectively.

In order to be able to set or to adjust the throttling sealing gap 14 with respect, for example, to the gap length and the gap width, the control valve 1 offers, depending on the embodiment, different possibilities. For example, it can be provided that at least one of the bearing shells 19 is formed adjustable relative to the line piece 2. For this, for example, through-openings 28 which are located in the respective bearing shell 19, and through which the screws 27 are inserted, can have a radial clearance or can be formed as slotted holes. Before tightening the screws 27, hence a bearing adjustment of the rotational axis 6 can be realized, which affects the throttling sealing gap 14 via the flap 4 mounted to the drive shaft 5. Also, it is principally possible to form at least one of the bearings 18 adjustable relative to the respective bearing shell 19. For this, for example, the respective bearing support 20 can have an appropriate oversize, whereby it is possible to align the respective bearing 18 within the bearing support 20. The positional fixation of the bearing 18 within the bearing support 20 is then carried out by means of an axial clamping with the aid of the bearing cover 23. By means of the adjustment of the respective bearing 18, the position of the rotational axis 6, and hence the throttling sealing gap 14, can also be changed. Also, it is principally possible to form the flap 4 adjustable relative to the drive shaft 5 in such a manner that the flap 4 in its flap plane is shiftable relative to the drive shaft 5. By means of shifting the flap 4 relative to the drive shaft 5, a shifting of the flap 4 relative to the line piece 2 takes place at the same time, whereby the throttle sealing gap 14 is adjustable.

The preceding different possibilities for adjusting the throttling sealing gap 14 can be realized alternatively or cumulatively, depending on the embodiment of the control valve 1. Furthermore, the adjustment of the throttling sealing gap 14 within the scope of the pre-assembly of the control valve 1 is preferably designed as a one-time process in which the optimal adjustment, once it is found, of the throttling sealing gap 14 is fixed by appropriate measures.

FIGS. 3 to 5 show, exemplary and without limitation of the generality, different embodiments for realization of an adjustability of the flap 4 relative to the drive shaft 5 within the flap plane. In these embodiments, the flap 4 is designed with respect to the drive shaft 5 as a separate component which is rotationally fixed connected with the drive shaft 5 in a suitable manner.

According to FIG. 3, the flap 4 has a through-opening 29 which runs coaxial to the rotational axis 6 and by means of which the flap 4 can be put in axial direction onto the drive shaft 5. Hence, the drive shaft 5 penetrates the through-opening 29. For realization of the adjustability of the flap 4 within the flap plane relative to the drive shaft 5 which, via its support, is arranged stationary with respect to the line piece 2, the through-opening 29 can now have an elliptical cross section. Principally, for the through-opening 29, other cross sections, which allow a relative shift between the flap 4 and the drive shaft 5 in the flap plane, are also possible. The flap 4 is adjustable radially, and optionally also axially, relative to the drive shaft 5. As soon as the respective optimal adjustment for the throttling sealing gap 14 is found, the associated relative position between flap 4 and drive shaft 5 can be fixed, e.g., in that a cavity within the through-opening 29 between the drive shaft 5 and the flap 4 is filled-up with a curing adhesive, or with a plastic to be injected, or with a resin, or the like.

According to FIG. 4, also in another embodiment, an enlargement of the through-opening 29 in direction of the flap plane can be provided to thereby allow a movability of the flap 4 in the flap plane relative to the drive shaft 5. For example, this is provided again by means of an elliptical cross section. In addition, between the flap 4 and the drive shaft 5, a tongue and groove coupling 30 is formed which is also arranged within the flap plane, which thereby allows relative shifts between the flap 4 and the drive shaft 5 within the flap plane, and which, however, at the same time provides a rotationally fixed coupling by means of a positive locking between the flap 4 and the drive shaft 5. The tongue and groove coupling 30 comprises here two tongue sections 31 which, in the flap plane, radially project on diametrically opposing sides of the drive shaft 5 and which extend in their longitudinal direction. The associated grooves 32 are incorporated into the flap 4 and form lateral recesses within the through-opening 29. The grooves 32 extend complementary to the tongue sections 31, in fact within the flap plane. The radial shiftability with respect to the rotational axis 6 between the flap 4 and the drive shaft 5 is indicated in FIG. 4 by means of a double arrow 33. It is obvious that the flap 4, relative to the drive shaft 5, can also be adjustable parallel to the rotational axis 6.

In the embodiment shown in FIG. 5, the flap 4 is mounted to the drive shaft 5 by means of fastening elements 34. For this, on two diametrically opposing sides, the drive shaft 5 has rib-like connection sections 35 which extend parallel to the flap plane, but however, are spaced apart thereto. The flap 4 is put onto the connection sections 35 and is mounted by means of the fastening elements 34 to the connection sections 35 in a manner that the flap 4 extends within the flap plane which comprises the rotational axis 6. For example, the fastening elements 34 are screws or rivets, each of them penetrating one through-opening 36 within the flap 4. The through-openings 36 can have a radial clearance with respect to the respective fastening element 34, which results in the desired adjustability of the flap 4 relative to the drive shaft 5. For example, the through-openings 36 are formed as slotted holes. When the optimal relative position between the flap 4 and the drive shaft 5 is found, thus with an optimally adjusted throttling sealing gap 14, the found relative position is fixed by means of the fastening elements 34.

For finding the optimal adjustment of the throttling sealing gap 14, it is in particular possible to attach abrasive coatings on the sealing contour 15 and/or on the sealing face 16, as this is proposed, for example, in the above mentioned EP 1 498 596 A2, the relevant content of which is herewith added by explicit reference to the disclosure of the present invention.

Alternatively to the mentioned adjustment possibilities for adjusting an optimal throttling sealing gap 14, within the scope of the manufacture of the control valve 1, there are further possibilities to manufacture the throttling sealing gap 14 with the desired dimensions. Thus, for example, the flap 4 can first be pre-fabricated, wherein it does not have yet its final shape, in particular in the area of its sealing contour 15. The flap 4, which is unfinished in this respect, is positioned within the line piece 2, e.g. by proper installation of the drive shaft 5 including the flap 4 mounted thereto. The positioning of the flap 4 within the line piece 2 takes place in a pre-determined relative position or set position. Here, the flap 4 and the line piece 2 are adjusted to one another in a manner that, in this initial state, in radial direction between the sealing contour 15 and the sealing face 16, a distance is provided which is kept smaller with respect to the throttling sealing gap 14 yet to be manufactured or with respect to the gap width thereof, respectively; in particular, the sealing contour 15 can contact and/or even overlap the sealing face 16, at least in certain areas. While maintaining this set position between the flap 4 and the line piece 2, the throttling sealing gap 14 is manufactured by means of machining of the sealing contour 15 and/or the sealing face 16. For example, the throttling sealing gap 14 is cut out by cutting the sealing contour 15 and/or the sealing face 16. Conceivable is, for example, a laser cutting method or a water jet cutting method.

In another embodiment, the flap 4 can be manufactured, for example, by injection molding, in particular from plastic. Here, the sealing face 16 can form, within a molding tool for injection molding the flap 4, a wall section which serves for bordering the sealing contour 15. Preferably, the molding parameters, such as temperature and pressure, and the flap material can be selected such that the throttling sealing gap 14 is generated on its own, in fact by shrinkage of the cooling flap material.

Alternatively, the sealing face 16 can be manufactured by injection molding as well, wherein then the flap 4 or its sealing contour 15, respectively, within a molding tool for injection molding the sealing face 16, forms a wall section which serves for bordering the sealing face 16. Also here the molding parameters and the used material can be selected in such a manner that the throttling sealing gap 14 is generated on its own during cooling.

In a further variant, the pre-fabricated, but not yet finished flap 4 can be positioned in a pre-determined relative position or set position within the line piece 2, e.g. by installation of the drive shaft 5 which is fixed connected therewith. For this, the unfinished flap 4 and the line piece 2 are adjusted to one another in such a manner that in this initial state, between the sealing contour 15 and the sealing face 16, a distance is present which is kept greater with respect to the throttling sealing gap 14 yet to be manufactured or the gap width thereof, respectively. The flap 4 positioned in such a manner can now be finish-formed by means of selective heating and plastic forming in such a manner that a flap edge moves in direction of the sealing face 16. With this forming process, the throttling sealing gap 14 is formed at the same time. Such a forming process can be realized, for example, by the so-called hot pressing. It is also possible to carry out the heating of the section to be formed by means of ultrasound. Furthermore, it is principally possible to form the line piece 2 in such a manner that it can be used as a stamping tool for stamping-out the flap 4 from a sheet material. The line piece 2 has then a corresponding cutting edge. In addition, at the line piece 2, a cross section widening can then be formed which follows the cutting edge and which is dimensioned such that the flap 4, which is stamped-out by the line piece 2, automatically forms in the provided sealing cross section the desired throttling sealing gap 14 with respect to the sealing face 16.

The invention claimed is:

1. A control valve for controlling a gas flow direction in a gas line of an internal combustion engine, comprising:
    a flap which is rotationally adjustable about a rotational axis which runs transverse to the flow direction, for controlling of a flow cross section, wherein the flap includes a closed position;
    a sealing face facing the flap;
    a sealing contour of the flap;
    an adjustable throttling sealing gap is configured radially between the sealing contour and the sealing face when the flap is in the closed position, wherein the adjustable throttling sealing gap is adjustable with respect to at least one of a gap length and a gap width;
    a drive shaft which extends coaxial to the rotational axis and on which the flap is arranged in a rotationally fixed manner,
    a line piece that is provided for installation in the gas line axially between line ends of the gas line opposing one another, wherein the line piece includes the flow cross section;
    at least two bearings arranged on both sides of the line piece; and
    two bearing shells that are arranged, with respect to the flow cross section, outside of the line piece on diametrically opposing sides, and wherein each of the bearing shells includes at least one of the at least two bearings;
    wherein at least one of the two bearings is adjustable relative to the bearing shell and the two bearing shells are adjustable relative to the line piece, thereby providing adjustability for the adjustable throttle sealing gap,
    wherein the flap controls the flow cross section of the line piece, and the sealing face is configured at the line piece, and
    wherein the drive shaft penetrates the line piece and is supported rotationally adjustably in the at least two bearings.

2. The control valve according to claim 1, wherein the bearing shells, with respect to the line piece, are separate components mounted to the line piece.

3. The control valve according to claim 1, wherein the bearing shells and the at least two bearings have similar coefficients of thermal expansion that are at least one of:
    i. differing less than about 20% from one another; and
    ii. are about equal.

4. The control valve according to claim 1, wherein the flap and the line piece have similar coefficients of thermal expansion that are at least one of:
  i. differing less than about 20% from one another; and
  ii. are about equal.

5. The control valve according to claim 1, wherein at least one of the flap and the line piece have at least one of the following:
  i. a thermal expansion coefficient of maximal about $5\times10^{-6}$/K at about 20° C.; and
  ii. a coefficient of thermal expansion of maximal about $2\times10^{-6}$/K at about 20° C.

6. The control valve according to claim 1, wherein at least one of the following is selected:
  i. the flap has a different coefficient of thermal expansion than at least one of the at least two bearings and the bearing shells, and
  ii. the line piece has a different coefficient of thermal expansion than at least one of the at least two bearings and the bearing shells.

7. The control valve according to claim 1, wherein the bearing shells include at least one through opening, which is at least one of radially clearanced and slotted for adjustment of the adjustable throttling sealing gap.

8. The control valve according to claim 1, wherein the flap is adjustable relative to the drive shaft for adjusting the adjustable throttling sealing gap within a flap plane, which comprises the rotational axis.

9. The control valve according to claim 1, wherein at least one of the following is selected:
  i. the flap is a separate component from the drive shaft, and
  ii. the flap is mounted to the drive shaft.

10. The control valve according to claim 1, wherein one of the following is selected:
  i. the adjustable throttling sealing gap is at least one of a machined sealing contour and of a machined sealing face,
  ii. the adjustable throttling sealing gap is a shrinkage flap, which is injection-molded up to the sealing face, and
  iii. the adjustable throttling sealing gap is a radial expansion flap, which undergoes heating and subsequent forming.

11. A gas line gas flow control valve, comprising:
  a rotationally adjustable flap, the flap being rotational about an axis extending transverse to a flow direction, and wherein the adjustable flap includes a closed position;
  at least one of a sealing face and a sealing contour;
  an adjustable throttling sealing gap, wherein when the flap is in the closed position the adjustable throttling sealing gap is configured radially between the sealing contour and the sealing face, wherein the adjustable throttling sealing gap is adjustable with respect to at least one of a gap length and a gap width;
  a drive shaft extending coaxial to the axis and on which the flap is arranged in a rotationally fixed manner;
  a line piece that is provided for installation in the gas line axially between line ends of the gas line opposing one another, wherein the line piece includes the flow cross section;
  at least two bearings arranged on both sides of the line piece; and
  two bearing shells that are arranged, with respect to the flow cross section, outside of the line piece on diametrically opposing sides, and wherein each of the bearing shells includes at least one of the at least two bearings;
  at least one of the two bearings being adjustable relative to the bearing shell and the two bearing shells are adjustable relative to the line piece, thereby providing adjustability for the adjustable throttle sealing gap; and
  wherein the bearing shells house an oversized bearing support, the bearing being aligned within the bearing support, such that the axis is moveable between a first predetermined position and a second predetermined position for adjusting the adjustable throttling sealing gap, and wherein the bearing is positionally fixed in at least one of the first predetermined position and the second predetermined position by a bearing cover.

12. The control valve according to claim 11, wherein the flap and the line piece have similar coefficients of thermal expansion that are differing less than about 20% from one another.

13. The control valve according to claim 11, wherein at least one of the flap and the line piece have
  i. a thermal expansion coefficient of maximal about $5\times10^{-6}$/K at about 20° C.

14. The control valve according to claim 11, wherein at least one of the following is selected:
  i. the flap has a different coefficient of thermal expansion than at least one of the at least two bearings and the bearing shells, and
  ii. the line piece has a different coefficient of thermal expansion than at least one of the at least two bearings and the bearing shells.

15. The control valve according to claim 11, wherein the flap is adjustable relative to the drive shaft for adjusting the adjustable throttling sealing gap within a flap plane which comprises the axis.

16. The control valve according to claim 11, wherein at least one of the following is selected:
  i. the flap is a component which is manufactured separately from the drive shaft, and
  ii. the flap is mounted to the drive shaft.

17. The control valve according to claim 11, wherein one of the following is selected:
  the adjustable throttling sealing gap is at least one of a machined sealing contour and of a machined sealing face, ii. the adjustable throttling sealing gap is a shrinkage flap, which is injection-molded up to the sealing face, and
  iii. the adjustable throttling sealing gap is a radial expansion flap, which undergoes heating and subsequent forming.

18. The control valve according to claim 11, wherein the flap and the line piece have similar coefficients of thermal expansion that are about equal.

19. The control valve according to claim 11, wherein at least one of the flap and the line piece have a coefficient of thermal expansion of maximal about $2\times10^{-6}$/K at about 20° C.

20. The control valve according to claim 11, wherein the bearing shells and the at least two bearings have similar coefficients of thermal expansion that are at least one of:
  i. differing less than about 20% from one another; and
  ii. are about equal.

* * * * *